No. 843,485. PATENTED FEB. 5, 1907.
J. P. OLSEN.
SHOE LACE HOLDER.
APPLICATION FILED MAY 16, 1906.
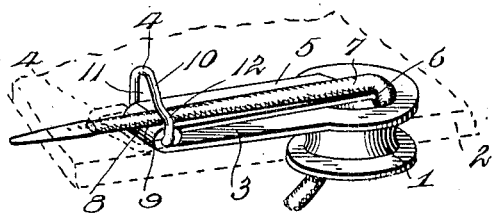
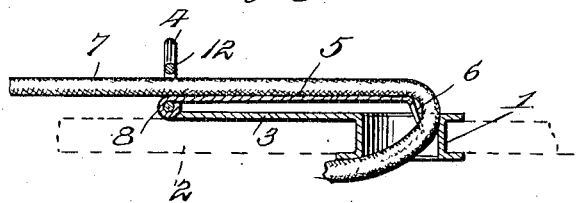

UNITED STATES PATENT OFFICE.

JOHN P. OLSEN, OF MINNEAPOLIS, MINNESOTA.

SHOE-LACE HOLDER.

No. 843,485.      Specification of Letters Patent.      Patented Feb. 5, 1907.

Application filed May 16, 1906. Serial No. 317,170.

*To all whom it may concern:*

Be it known that I, JOHN P. OLSEN, a citizen of the United States, residing at Minneapolis, in the county of Hennepin and State of Minnesota, have invented new and useful Improvements in Shoe-Lace Holders, of which the following is a specification.

This invention relates to shoe-lace holders designed for securing the upper ends of the laces to prevent them from becoming unlaced, and has for its objects to produce a comparatively simple inexpensive device of this character with which the lace may be readily and securely engaged, one which will effectually secure the lace, and one which may be conveniently manipulated for releasing the lace when desired.

With these and other objects in view the invention comprises the novel features of construction and combination of parts more fully hereinafter described.

In the accompanying drawings, Figure 1 is a perspective view of a shoe-lace holder embodying the invention and showing a lace clamped therein. Fig. 2 is a sectional view taken centrally and longitudinally through the holder.

Referring to the drawings, 1 designates an eyelet adapted to be secured as usual in the shoe-flap 2 and provided in accordance with the invention with an inwardly or rearwardly extended portion or arm 3, to the outer end of which there is hinged by means of a pivoting member 4 a lace-engaging member 5, provided at its forward end with a plurality of inturned lace-engaging portions or teeth 6, arranged to project into the eyelet 1 for engagement with the lacing-cord 7 and having at its rear end a hinge ear or knuckle 8, arranged between coöperating knuckles 9, provided on the arm 3, for the reception of the pivoting member 4.

The pivoting member 4 is preferably composed of wire and in the form of a loop or bail having an outer side portion or bar 10 bent, as shown, to form an enlarged entrance-space 11 to the clamping portion 12, designed for coöperation with the adjacent face of the member 5 to clamp the lace 7.

In practice after passing the lacing-cord through the eyelet the member 5 is swung to engaging position with the teeth 6 projected into the eyelet and in engagement with the cord, after which the tipped end of the lace is passed through the entrance-space 11 into the member or bail 4 and then drawn to a position between the clamping portion 12 of the latter and the adjacent face of the member 5, as seen more clearly in Fig. 1, the bail being finally turned downward to a horizontal position at the end of and in line with the arm 30, (shown by dotted lines in said figure,) whereby the cord will be drawn downward over the end of the arm 3 and securely clamped by the bail. It is apparent that in order to release the cord the bail is swung outward and the cord drawn laterally from beneath the portion 12, after which the member 5 is swung outwardly and rearwardly to free the teeth 6 from engagement with the cord, which may then run freely through the eyelet.

Having thus described my invention, what I claim is—

1. A shoe-lace holder comprising an eyelet having a lateral extension, a lace-engaging member pivoted to said extension and provided with teeth formed to project into the eyelet and engage the lacing-cord, and a pivoted member for connecting the engaging member with the extension, said pivoted member having a clamping portion adapted to coöperate with the adjacent portion of the holder for clamping the cord.

2. A shoe-lace holder comprising an eyelet having a lateral extension, a lace-engaging member pivoted to the extension and provided with a tooth formed to project into the eyelet and engage the lacing-cord, and a pivoted member for hingedly connecting the engaging member with the extension, said pivoted member being in the form of a bail bent to form an entrance-space for the cord and a clamping portion adapted to coöperate with the adjacent portion of the holder for clamping the cord.

In testimony whereof I affix my signature in presence of two witnesses.

JOHN P. OLSEN.

Witnesses:
    A. L. PETERSON,
    WILLIAM C. SALMON.